(12) United States Patent
Jiang et al.

(10) Patent No.: US 9,790,415 B1
(45) Date of Patent: *Oct. 17, 2017

(54) MODIFIED SILICON DIOXIDE NANO-PARTICLES AND PREPARATION METHOD THEREOF, AND DRILLING FLUID SUITABLE FOR SHALE GAS WELLS

(71) Applicant: CHINA UNIVERSITY OF PETROLEUM (BEIJING), Beijing (CN)

(72) Inventors: Guancheng Jiang, Beijing (CN); Yinbo He, Beijing (CN); Qingying Ge, Beijing (CN); Lili Yang, Beijing (CN); Fan Liu, Beijing (CN); Yuxiu An, Beijing (CN); He Shi, Beijing (CN); Yawei Shi, Beijing (CN); Guangchang Ma, Beijing (CN); Yong Qin, Beijing (CN); Jienian Yan, Beijing (CN); Chunyao Peng, Beijing (CN); Haifang Sun, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,210

(22) Filed: Apr. 17, 2017

(30) Foreign Application Priority Data

May 11, 2016 (CN) .......................... 2016 1 0308130

(51) Int. Cl.
*C09K 8/035* (2006.01)
*C09K 8/24* (2006.01)
*C08F 222/38* (2006.01)

(52) U.S. Cl.
CPC .......... *C09K 8/035* (2013.01); *C08F 222/385* (2013.01); *C09K 8/24* (2013.01); *C09K 2208/10* (2013.01)

(58) Field of Classification Search
CPC . C09K 8/32; C09K 8/36; C09K 17/16; C09K 8/035; C09K 8/12; C09K 8/516; C09K 17/22; C09K 8/5083; C09K 8/60; C09K 8/92; C09K 8/35; C09K 8/34; C09K 8/426; C09K 8/467; C09K 2208/10; C09K 2208/08; C09K 2208/22; C09K 8/44; C09K 8/508; C09K 8/52; C09K 8/68; C09K 8/88; Y10S 507/903; E21B 21/068; E21B 21/00; E21B 7/00; E21B 43/267
See application file for complete search history.

(56) References Cited

U.S. PATENT DOCUMENTS 5,167,766 A * 12/1992 Honig ................ D21H 21/54
162/164.1
2013/0045901 A1* 2/2013 Bicerano ............... B82Y 30/00
507/231

FOREIGN PATENT DOCUMENTS

| CN | 101037498 A | | 3/2006 |
|---|---|---|---|
| CN | 102268166 A | | 6/2010 |
| CN | 103992425 A | | 5/2014 |
| CN | 104258911 A | | 1/2015 |
| CN | 104628931 | * | 5/2015 |
| WO | 2013060798 A1 | | 5/2013 |

OTHER PUBLICATIONS

Liu et al., "Study on High Salt-Tolerant and Uniform Polymer Microspheres as Profile-Control and Oil-Displacement Agent", Journal of Oil and Gas Technology Oct. 2014 vol. 36 No. 10, pp. 189-195, English Abstract.

* cited by examiner

*Primary Examiner* — Kumar R Bhushan
(74) *Attorney, Agent, or Firm* — Calfee, Halter & Griswold LLP

(57) ABSTRACT

The present invention relates to the petroleum drilling fluid field, and discloses a modified silicon dioxide nano-particle comprising a modifying polymer chain composed of structural units provided by one or more of monomers represented by the following formula (1) and one or more of monomers represented by the following formula (2). The present invention provides a method for preparing modified silicon dioxide nano-particles and a drilling fluid suitable for shale gas wells containing the modified silicon dioxide nano-particles as a plugging agent. When the modified silicon dioxide nano-particles provided in the present invention are used as a plugging agent in a drilling fluid, they will not agglomerate into large-size particles, and can achieve a good plugging effect.

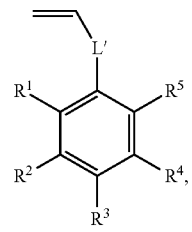

Formula (1)

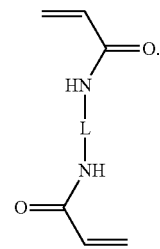

Formula (2)

20 Claims, 1 Drawing Sheet

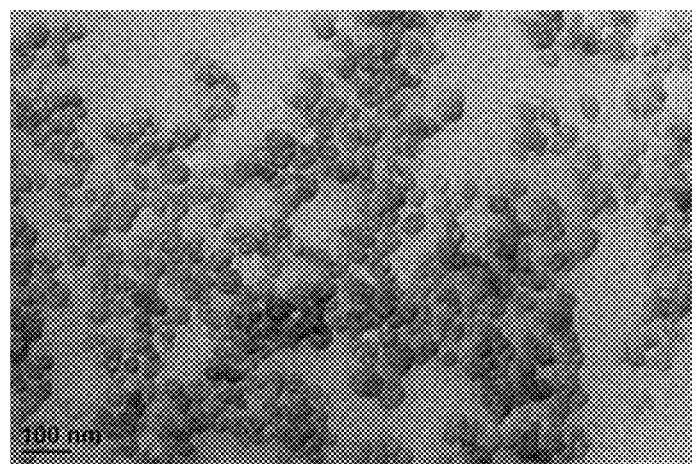

MODIFIED SILICON DIOXIDE NANO-PARTICLES AND PREPARATION METHOD THEREOF, AND DRILLING FLUID SUITABLE FOR SHALE GAS WELLS

CROSS REFERENCE TO RELATED APPLICATIONS

This application claims priority to Chinese Application No. 201610308130.0, filed on May 11, 2016, entitled "Modified Silicon dioxide nano-particles and Preparation Method Thereof, and Drilling Fluid Suitable for Shale Gas Wells" which is specifically and entirely incorporated by reference.

FIELD OF THE INVENTION

The present invention relates to the petroleum drilling fluid field, in particular to modified silicon dioxide nano-particles, a method for preparing the modified silicon dioxide nano-particles, and a drilling fluid suitable for shale gas wells.

BACKGROUND OF THE INVENTION

Borehole collapse, circulation loss, and oil and gas formation protection are three major technical difficulties that constrain successful implementation of drilling engineering. For formations where beddings and fractured are developed, especially mud shale formations, to prevent borehole collapse and circulation loss and reduce damage to the oil and gas reservoir, the drilling fluid must have high plugging performance and can effective plug the beddings and crevices, so that the drilling fluid and its filtrate can't infiltrate into the formation, in order to improve formation bearing capacity, stabilize well bore, prevent circulation loss, and protect gas and oil reservoir. To that end, researches have been made on methods for evaluating plugging agents used in drilling fluids and relevant influencing factors.

Since the twentieth century, shale gas exploration and development has been carried out in China, and dozens of shale gas wells have been drilled. To prevent wall sloughing of horizontal shale gas wells, oil-based drilling fluids with a strong inhibition property are usually used, but the well-bore instability problem can't be solved with oil-based drilling fluids or synthetic drilling fluids satisfactorily. There are corresponding core ideals for solving the well-bore instability problem of different shale wells in foreign countries: for Haynesville shale, a solution to the shale dispersion problem should be considered mainly; for Fayetteville shale, shale cleavage incurred by crevices should be considered mainly; for Barnett shale, inhibition of hydration should be considered mainly.

For drilling fluids that have a strong inhibition property, one of the main reasons for well-bore instability is the transfer of hydraulic pressure through micro-crevices; therefore, the plugging property of the drilling fluids against micro-crevices must be improved. Micro-crevices are usually in size between nanometer and micrometer; conventional plugging agents are too large in size to provide a satisfactory plugging effect; therefore, plugging with nanometer materials is a good method. However, if nanometer particles are added into a drilling fluid, the solid content and sub-micrometer particle content in the drilling fluid will be increased inevitably, causing increased opportunity of damages to the oil and gas reservoir by fine particles; in addition, since the materials added into the drilling fluid have high surface activity, they will absorb a part of drilling fluid adhesives, causing decreased effective contents of the drilling fluid adhesives; moreover, the material may agglomerate easily, and the agglomerated particles are much larger in size and are difficult to be dispersed to nanometer level merely by agitation; consequently, the agglomerated particles lose the properties of nanometer particles.

Though some breakthroughs have been made in nanometer plugging agents, there are still many problems: firstly, as calculated by Al-Bazali with a capillary pressure formula in 2005, the pore throat sizes of mud shale are distributed between 10 nm and 30 nm; according to the one-third plugging theory, the particle diameter of the plugging material should be approximately equal to one third of the pore size, which means the plugging material can attain a good mud shale plugging effect only if the particle diameter of the plugging material is between 3 nm and 10 nm; however, most nanometer plugging agents developed domestically in China have particle diameter greater than 50 nm, and can't achieve effective plugging. Secondly, the material may agglomerate easily, and the agglomerated particles are much larger in size and are difficult to be dispersed to nanometer level merely by agitation.

SUMMARY OF THE INVENTION

To overcome the above-mentioned drawbacks of the nanometer plugging agents used in drilling fluids in the prior art, the present invention provides modified silicon dioxide nano-particles that don't agglomerate easily and can maintain a good plugging effect, a method for preparing the modified silicon dioxide nano-particles, and a drilling fluid suitable for shale gas wells.

To attain the object described above, the present invention provides a modified silicon dioxide nano-particle, of which the modifying group comprises a modifying polymer chain composed of structural units provided by one or more monomers represented by formula (1) and one or more monomers represented by formula (2); in the modifying polymer chain, the molar ratio of the structural units provided by the monomers represented by formula (1) to the structural units provided by the monomers represented by formula (2) is 1:0.5-5; the weight-average molecular weight of the modifying polymer chain is 100,000-2,500,000 g/mol;

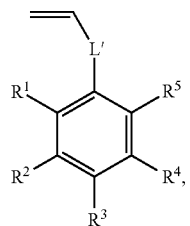

formula (1)

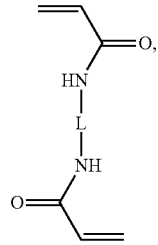

formula (2)

wherein one of $R^1$-$R^5$ is -L"-$SO_3$H and the rest of $R^1$-$R^5$ are independently selected from H, —OH, halogen, and C1-C10 alkyl; L, L' and L" are independently selected from C0-C10 alkylene.

In certain embodiments, the present invention provides a method for preparing the above modified silicon dioxide nano-particle comprising:
(1) subjecting one or more of monomers represented by formula (1) and one or more of monomers represented by formula (2) to have a contact reaction with silicon dioxide nano-particles, in the presence of a monohydric alcohol and a coupler;
(2) subjecting the product of the contact reaction to have a polymerization reaction, in the presence of a redox initiator system;

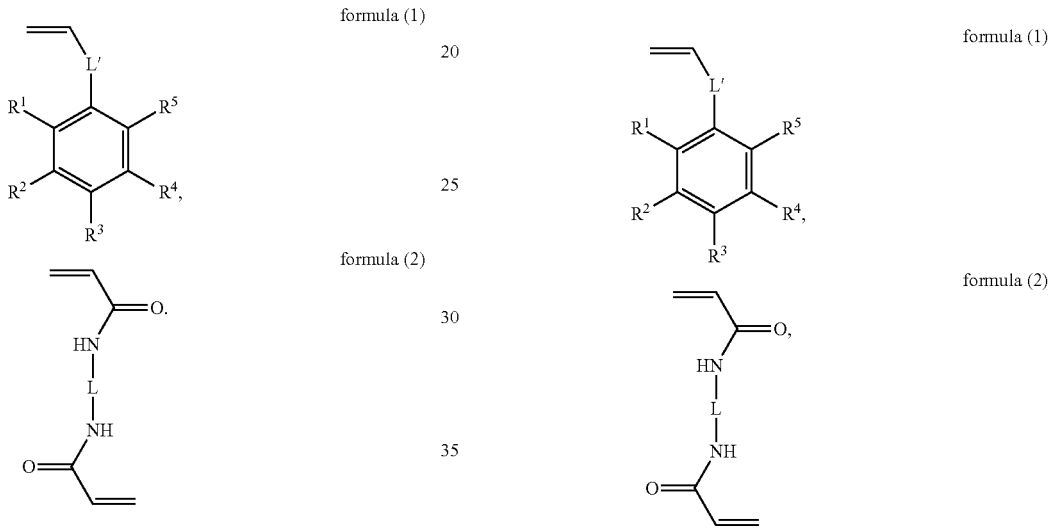

formula (1)

formula (2)

In certain embodiments, the present invention provides a drilling fluid containing the above-mentioned modified silicon dioxide nano-particles as plugging agent.

When the modified silicon dioxide nano-particles provided in the present invention are used as a plugging agent in a drilling fluid, they will not agglomerate or will not agglomerate into particles in a very large size easily, and the resultant drilling fluid can achieve a good plugging effect, and is a drilling fluid suitable for shale gas wells.

Other features and advantages of the present invention will be further detailed in the embodiments hereunder.

BRIEF DESCRIPTION OF DRAWINGS

FIG. 1 is a SEM image of the modified silicon dioxide nano-particles obtained in example 1.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

The present invention provides a modified silicon dioxide nano-particle, of which the modifying group comprises a modifying polymer chain composed of structural units provided by one or more of monomers represented by the following formula (1) and one or more of monomers represented by the following formula (2); in the modifying polymer chain, the molar ratio of the structural units provided by the monomers represented by formula (1) to the structural units provided by the monomers represented by formula (2) is 1:0.5-5; the weight-average molecular weight of the modifying polymer chain is 100,000-2,500,000 g/mol;

formula (1)

formula (2)

wherein one of $R^1$-$R^5$ is -L"-$SO_3$H and the rest of $R^1$-$R^5$ are independently selected from H, —OH, halogen, and C1-C10 alkyl; L, L' and L" are independently selected from C0-C10 alkylene.

The present invention further provides a drilling fluid, which contains the above-mentioned modified silicon dioxide nano-particles as a plugging agent.

In certain embodiments, since the modifying groups on the modified silicon dioxide nano-particles include the modifying polymer chains, it is equivalent to that the modifying polymer chain is grafted on the nano-silicon dioxide; thereby, a spatial network structure attained by virtue of noncovalent bonds such as hydrophilic and hydrophobic groups and hydrogen bonds, etc. and the adsorptive effect of amido groups, so that the modified silicon dioxide nano-particles will not agglomerate easily or will not agglomerate into large-grained agglomerates but maintain high dispersity when the modified silicon dioxide nano-particles are used as plugging agent in a drilling fluid; therefore, when the drilling fluid is inserted into shale, the plugging agent can plug the crevices in the shale satisfactorily to attain the purpose of improving the bearing capability of the formation, stabilize the well wall, prevent leakage from the well, and protect the oil and gas reservoir.

In certain embodiments, one of $R^1$-$R^5$ is -L"-$SO_3$H, and the rest of $R^1$-$R^5$ are independently selected from H, and C1-C6 alkyl; L, L' and L" are independently selected from C0-C6 alkylene.

In certain embodiments, one of $R^1$-$R^5$ is -L"-$SO_3H$, and the rest of $R^1$-$R^5$ are independently selected from H, and C1-C4 alkyl; L, L' and L" are independently selected from C0-C4 alkylene.

In certain embodiments, one of $R^1$-$R^5$ is -L"-$SO_3H$, and the rest of $R^1$-$R^5$ are independently selected from H, methyl, ethyl, propyl and butyl; L' and L" are independently selected from C0 alkylene, —$CH_2$—, —$CH_2$—$CH_2$—, —$CH_2$—$CH_2$—$CH_2$—, —$CH(CH_3)$—$CH_2$—, —$C(CH_3)_2$—$CH_2$—, —$CH_2$—$C(CH_3)_2$— and —$CH_2$—$CHCH_3$—$CH_2$—; L is —$CH_2$—, —$CH_2$—$CH_2$—, —$CH_2$—$CH_2$—$CH_2$—, —$CH(CH_3)$—$CH_2$—, —$C(CH_3)_2$—$CH_2$—, —$CH_2$—$C(CH_3)_2$— or —$CH_2$—$CHCH_3$—$CH_2$—. C0 alkylene means that the groups at the two ends of L, L' or L" are directly linked, or may be understood as that L, L' or L" doesn't exist or is a linking bond. In certain embodiments, $R^3$ is -L"-$SO_3H$.

Wherein, examples of -L"-$SO_3H$ may include: —$SO_3H$, —$CH_2$—$SO_3H$, —$CH_2$—$CH_2$—$SO_3H$, —$CH_2$—$CH_2$—$CH_2$—$SO_3H$, —$CH(CH_3)$—$CH_2$—$SO_3H$, —$C(CH_3)_2$—$CH_2$—$SO_3H$, —$CH_2$—$C(CH_3)_2$—$SO_3H$ or —$CH_2$—$CHCH_3$—$CH_2$—$SO_3H$.

Wherein, examples of the C1-C10 alkyl may include: methyl, ethyl, propyl, isopropyl, butyl, isobutyl, sec-butyl, tert-butyl, amyl, hexyl, heptyl, octyl, nonyl, and decyl.

In certain embodiments, the monomers represented by formula (1) are preferably selected from one or more of compounds represented by the following formulae:

formula (1-1): in the formula (1), $R^3$ is —$SO_3H$, $R^1$-$R^2$ and $R^4$-$R^5$ are H, and L' is C0 alkylene (also referred to as p-styrenesulfonic acid);

formula (1-2): in the formula (1), $R^1$ is —$SO_3H$, $R^2$-$R^5$ are H, and L' is C0 alkylene (also referred to as o-styrenesulfonic acid);

formula (1-3): in the formula (1), $R^2$ is —$SO_3H$, $R^1$ and $R^3$-$R^5$ are H, and L' is C0 alkylene (also referred to as m-styrenesulfonic acid);

formula (1-4): in the formula (1), $R^3$ is —$SO_3H$, $R^2$ is methyl, $R^1$ and $R^4$-$R^5$ are H, and L' is C0 alkylene (also referred to as p-2-methyl-4-styrenesulfonic acid).

In certain embodiments, the monomers represented by formula (2) are preferably selected from one or more of compounds represented by the following formulae:

formula (2-1): in the formula (2), L is —$CH_2$— (also referred to as N,N'-methylene-bis acrylamide);

formula (2-2): in the formula (2), L is —$CH_2$—$CH_2$— (also referred to as N,N'-ethylidene-bis acrylamide).

In certain embodiments, the structural units in the modifying polymer chain is composed of one or more of structural units represented by the following formula (1-a) and structural units represented by the following formula (2-a):

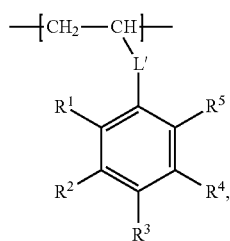

formula (1-a)

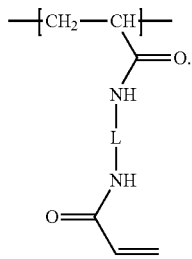

formula (2-a)

Wherein, $R^1$-$R^5$, L, L' and L" are those as defined above.

In certain embodiments, the modifying polymer chain is a linear copolymer chain consisting of one or more of the structural units represented by formula (1-a) and one or more of the structural units represented by formula (2-a), and may be a random linear copolymer chain, or a block linear copolymer chain, or an alternating linear copolymer chain. There is no particular restriction on the specific structure of the linear copolymer chain. However, for convenience, preferably the linear copolymer chain is a random linear copolymer chain.

Wherein, the structural units represented by formula (1-a) and the structural units represented by formula (2-a) may be selected preferably depending upon the monomers represented by formula (1) and the monomers represented by formula (2) described above respectively.

In certain embodiments, as long as the modifying polymer chain consists of the structural units provided by the monomers represented by formula (1) and the structural units provided by the monomers represented by formula (2), the modifying polymer chain can be used as the modifying group on the silicon dioxide nano-particles to modify the surfaces of the silicon dioxide nano-particles, so as to avoid a phenomenon that the silicon dioxide nano-particles agglomerate into large-grain agglomerates when they are used as a nano-plugging agent in a drilling fluid and give play to the plugging effect of the modified silicon dioxide nano-particles; however, in order to enable the modified silicon dioxide nano-particles to have better ion compatibility (mainly evaluated by observing the cooperating effect with other drilling fluid additives), better high temperature stability, and better salt resistance property when the modified silicon dioxide nano-particles are used as a nano-plugging agent thereby to reduce filter loss of the drilling fluid, attain a favorable plugging effect, and solve wellbore instability problems during well drilling, preferably, in the modifying polymer chain, the molar ratio of the structural units provided by the monomers represented by formula (1) to the structural units provided by the monomers represented by formula (2) is 1:0.5-5, including 1:1-2, including 1:1.3-1.6, including 1:1.5-1.6.

In certain embodiments, the molecular weight of the modifying polymer chain may vary within a wide range, as long as the above-mentioned effect can be attained; preferably, the weight-average molecular weight of the modifying polymer chain is 100,000-2,500,000 g/mol, including 300,000-1,800,000 g/mol, including 500,000-1,600,000 g/mol, including 650,000-1,400,000 g/mol, including 700,000-1,300,000 g/mol, including 800,000-1,300,000 g/mol, and may be 860,000-1,280,000 g/mol, for example. If the weight-average molecular weight of the modifying polymer chain is within the above-mentioned ranges, especially within the preferred ranges, the modified silicon dioxide nano-particles have excellent performance when they are used as a nano-plugging agent.

In certain embodiments, the content of the modifying polymer chains on the modified silicon dioxide nano-particles may vary within a wide range, as long as a nano-plugging agent with excellent performance can be obtained; preferably, based on the total weight of the modified silicon dioxide nano-particles, the content of the modifying polymer chains is 60 wt % or higher, including 85 wt % or higher, including 90 wt % or higher, including 90-98 wt %, including 90-95 wt %.

In certain embodiments, the size of the modified silicon dioxide nano-particles may be adjusted according to the crevice condition of the rock stratum; however, it is common knowledge in the art that the average pore throat size of mud shale is usually within a range of 10-30 nm; since the modified silicon dioxide nano-particles in the present invention can be dispersed well in the drilling fluid and will not agglomerate into large agglomerated particles when they are used as plugging agent, the modified silicon dioxide nano-particles in the present invention may have a wide range of particle diameter, and can attain a good plugging effect even within the wide range of particle diameter. Thus, preferably, the particle diameter of the modified silicon dioxide nano-particles is 3-30 nm, including 10-30 nm.

The present invention provides a method for preparing the above modified silicon dioxide nano-particle comprising:
(1) subjecting one or more of monomers represented by formula (1) and one or more of monomers represented by formula (2) to have a contact reaction with silicon dioxide nano-particles, in the presence of a monohydric alcohol and a coupler;
(2) subjecting the product of the contact reaction to have a polymerization reaction, in the presence of a redox initiator system;

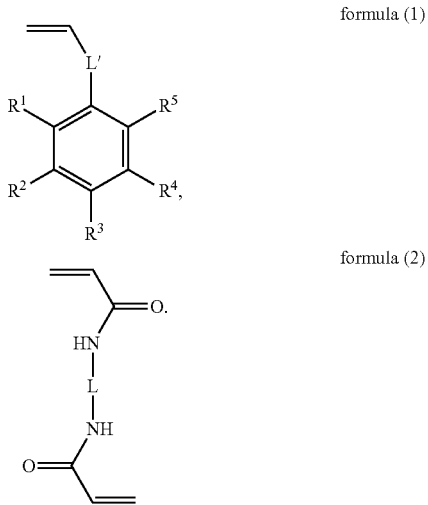

formula (1)

formula (2)

In certain embodiments, formulae (1) and (2) and the groups involved in them are those as described above, and will not be detailed further here.

In certain embodiments, in the step (1), there is no particular restriction on the amount of the monomers represented by formulae (1) and (2), which is to say, the amount may be selected according to the modified silicon dioxide nano-particles described above. For example, to obtain the modifying polymer chain consisting of structural units at a certain molar ratio described above and obtain the modifying polymer chain with appropriated molecular weight described above, preferably the molar ratio of the monomers represented by formula (1) to the monomers represented by formula (2) is 1:0.5-5, including 1:1-2, including 1:1.3-1.6, including 1:1.5-1.6. For example, to make the modified silicon dioxide nano-particles modified by the modifying polymer chains described above, preferably, based on the total amount of the silicon dioxide nano-particles, the monomers represented by formula (1) and the monomers represented by formula (2), the total amount of the monomers represented by formula (1) and the monomers represented by formula (2) is 60 wt. % or higher, including 85 wt. % or higher, including 90 wt. % or higher, further including 90-98 wt. %, optimally is 90-95 wt. %; in other words, the content of the silicon dioxide nano-particles is 40 wt. % or lower, including 20 wt. % or lower, including 10 wt. % or lower, including 2-10 wt. %, and may be 5-10 wt. %, for example.

According to the present invention, the size of the silicon dioxide nano-particles may be selected according to the size of the required modified silicon dioxide nano-particles. In certain embodiments, the particle diameter of the silicon dioxide nano-particles is 3-30 nm, including 10-30 nm.

In certain embodiments, in the step (1), in the presence of a coupler, one or more of the monomers represented by formula (1) and one or more of the monomers represented by formula (2) are subjected to contact with silicon dioxide nano-particles firstly (e.g., by mixing), so that active grafting sites are formed on the silicon dioxide nano-particles under the action of the coupler, and the silicon dioxide nano-particles would able to contact sufficiently with the monomers represented by formula (1) and the monomers represented by formula (2); in addition, in the presence of the monohydric alcohol, the reaction rate of the contact reaction and the reaction rate of the follow-up polymerization reaction can be controlled reasonably, so that modified silicon dioxide nano-particles required in the present invention, which will not agglomerate into large particles and have excellent plugging performance, can be obtained.

Wherein, there is no particular restriction on the kind of the monohydric alcohol, as long as the above-mentioned effect can be attained; preferably, the monohydric alcohol is one or more of methanol, ethanol, n-propanol and isopropanol, more preferably is one or more of isopropanol, n-propanol and ethanol. There is no particular restriction on the amount of the monohydric alcohol, as long as the reaction rates of the contact reaction and the polymerization reaction can be controlled and optimized to obtain silicon dioxide nano-particles modified by modifying polymer chains. Preferably, the weight ratio of the silicon dioxide nano-particles to the monohydric alcohol is 1:5-30, including 1:8-25, including 1:10-20, and may be 1:15-20, for example.

Wherein, there is no particular restriction on the kind of the coupler, as long as the above-mentioned effect can be attained. For example, the coupler may be one or more of silane coupler and the like, preferably is silane coupler, more preferably is one or more of γ-aminopropyl-triethoxysilane (also referred to as KH550), γ-glycidol ether propoxy-trimethoxysilane (also referred to as KH560), γ-(methyl-acryloyloxy)propyl-trimethoxysilane (also referred to as KH570), and N-(β-aminoethyl)-γ-aminopropyl-trimethoxysilane (also referred to as KH792). There is no particular restriction on the amount of the coupler, as long as the silicon dioxide nano-particles are activated appropriately to obtain an appropriate amount of sites where the modifying polymer chain can be grafted. Preferably, the weight ratio of the silicon dioxide nano-particles to the coupler is 100:0.2-10, including 100:0.4-5, including 100:1-4, including 100:1.2-3, and may be 100:1.2-2, for example.

In certain embodiments, though the step (1) may be implemented by adding the monohydric alcohol, coupler, one or more of the monomers represented by formula (1), and one or more of the monomers represented by formula (2) together into the reaction system, alternatively they may be mixed in separate steps freely and then the obtained mixtures may be mixed together. There is no particular restriction on the specific implementation in the present invention. However, to ensure that more ideal modified silicon dioxide nano-particles can be obtained after the contact reaction and the polymerization reaction, preferably, the step (1) comprises: mixing the monomers represented by formula (1) and the monomers represented by formula (2) firstly (e.g., mixing at 10-40° C. (preferably 20-30° C.) while stirring at a speed of 200-500 rpm (preferably 250-350 rpm) for 10-40 min (preferably 20-30 min)), and adjusting the pH of the obtained mixture to 7-9, including 7-8, including 7-7.5 (e.g., one or more of sodium hydroxide, potassium hydroxide, and lithium hydroxide, etc. can be used to make the adjustment); then, subjecting the mixture to have a contact reaction with the silicon dioxide nano-particles, in the presence of a monohydric alcohol and a coupler. To facilitate the operation on the well drilling site, more preferably, the step (1) comprises: preparing a mixture (hereinafter referred to as mixture A) of monomers represented by formula (1) and monomers represented by formula (2); preparing a mixture (hereinafter referred to as mixture B) of the monohydric alcohol and the silicon dioxide nano-particles (e.g., stirring for 10-40 min (preferably 20-30 min) at 200-500 rpm (preferably 250-350 rpm) stirring speed at 10-40° C. (preferably 20-30° C.)); mixing the mixture A with the mixture B to prepare a mixture C (e.g., stirring for 10-40 min (preferably 20-30 min) at 200-500 rpm (preferably 250-350 rpm) stirring speed at 10-40° C. (preferably 20-30° C.)); then, subjecting the mixture C to have the contact reaction in the presence of a coupler.

According to the present invention, preferably, in the step (1), the conditions of the contact reaction include: temperature of 10-40° C. (preferably 20-30° C.), and time of 10-60 min (preferably 20-30 min).

In certain embodiments, in step (2), under the initiation action of the redox initiator system, the monomers represented by formula (1) and the monomers represented by formula (2) are copolymerized, and grafted on the silicon dioxide nano-particles, so that modified silicon dioxide nano-particles grafted with the modifying polymer chains are obtained. Generally, the modifying polymer chains in the present invention may be understood as linear polymer chains, but are not limited to linear polymer chains.

In certain embodiments, there is no particular restriction on the kind of the redox initiator system, as long as the above-mentioned purpose can be attained; preferably, the reducer in the redox initiator system is sodium bisulfite. Preferably, the oxidizer in the redox initiator system is ammonium persulfate. Wherein, the molar ratio of the reducer to the oxidizer preferably is 1:1-5, more preferably is 1:2.5-3. There is no particular restriction on the amount of the redox initiator system, as long as the modified silicon dioxide nano-particles grafted with the modifying polymer chains required in the present invention can be obtained; preferably, with respect to 1 mol total amount of the monomers represented by formula (1) and the monomers represented by formula (2), the amount of the redox initiator system is 0.05-1 g, including 0.07-0.8 g, including 0.1-0.4 g, including 0.14-0.3 g, and may be 0.2-0.28 g, for example.

In certain embodiments, preferably, in the step (2), the conditions of the polymerization reaction include: temperature of 40-80° C. (preferably 50-70° C., e.g., 60° C.), and time of 3-6 h (preferably 4-5 h). The polymerization reaction may be carried out while stirring, for example, at 200-400 rpm stirring speed.

In certain embodiments, to extract the modified silicon dioxide nano-particles from the polymerization reaction system, the method may further comprise: drying the product of the polymerization reaction (e.g., drying for 5-20 h at 50-80° C., preferably at 60-70° C.) and milling it, to obtain the modified silicon dioxide nano-particles. Here, the product of the polymerization reaction is directly dried and milled, and then the obtained particles may be used as the nano-plugging agent in the drilling fluid. Therefore, the product obtained with the above method is directly used as modified silicon dioxide nano-particles, which include silicon dioxide particles with modifying polymer chains grafted on the silicon dioxide nano-particles, silicon dioxide nano-particles with modifying polymer coated on the particles, and other possible particles.

The present invention provides a modified silicon dioxide nano-particle prepared by the above-described method.

The product prepared by the above-described method can be deemed as the above described modified silicon dioxide nano-particle, that is the product obtained from the above-described method not only includes the silicon dioxide nano-particle grafted with a modifying polymer chain on the surface of the particle, but also includes the silicon dioxide nano-particle coated with modifying polymer, and other possible cases.

The present invention further provides a use of the modified silicon dioxide nano-particle as plugging agent in drilling fluid.

The present invention provides a drilling fluid containing the above-mentioned modified silicon dioxide nano-particles as plugging agent.

In certain embodiments, since the drilling fluid provided in the present invention contains the above-mentioned modified silicon dioxide nano-particles as a plugging agent, which don't agglomerate into large-size particles in the drilling fluid but still maintain a good dispersity, the modified silicon dioxide nano-particles that serve as a plugging agent can plug the crevices in shale excellently and reduce filter loss of the drilling fluid better; thus, it is obvious that the modified silicon dioxide nano-particles have high ion compatibility, high temperature stability, and high salt resistance properties, and will not absorb the drilling fluid excessively and thereby result in decreased effective content. Hence, when the drilling fluid that contains the modified silicon dioxide nano-particles is injected into shale, it can improve formation bearing capacity, stabilize well bore, prevent circulation loss, and protect oil and gas reservoir.

There is no particular restriction on the content of the modified silicon dioxide nano-particles in the drilling fluid in the present invention; namely, the content may be any conventional content of plugging agent in the art. Preferably, the content of the modified silicon dioxide nano-particles is 1-2 wt % (based on the total weight of the drilling fluid).

In certain embodiments, there is no particular restriction on the drilling fluid system that contains the modified silicon dioxide nano-particles; namely, the drilling fluid system may be any conventional drilling fluid system in the art, as long as the modified silicon dioxide nano-particles provided in the present invention are added into such a conventional drilling fluid system. Examples of such a conventional drilling fluid system may include one or more of potassium chloride-polyol drilling fluids, silicone drilling fluids, and cation drilling fluids. The potassium chloride-polyol drilling fluids may be different potassium chloride-polyol drilling fluids well known to those skilled in the art, such as one or more of potassium chloride-polyethylene glycol drilling fluid, potassium chloride-polypropylene glycol drilling fluid, potassium chloride-ethylene glycol/propylene glycol copolymer drilling fluid, potassium chloride-polyglycerol drilling fluid, and potassium chloride-polyethylene glycol drilling fluid; the silicone drilling fluids may be different silicone drilling fluids well known to those skilled in the art, and the silicone in the silicone drilling fluids may be selected from one or more of sodium methylsiliconate, potassium methylsiliconate, and silicone-potassium humate. The cation drilling fluids may be different cation drilling fluids well known to those skilled in the art, and the cation in the cation drilling fluids may be selected from one or more of 2,3-epoxypropyltrimethyl ammonium chloride, 3-chloro-2-hydroxypropyltrimethylammonium chloride, and cationic polyacrylamide.

In certain embodiments, the drilling fluid is a water-based drilling fluid, which may be a water-based drilling fluid that contains other additives; preferably, the drilling fluid provided in the present invention contain one or more of bentonite, tackifier, anti-collapse agent, filtrate reducer, lubricant, potassium chloride, calcium carbonate, barium sulfate, and alkali hydroxide.

Wherein, the bentonite is clay with montmorillonite as the essential mineral component, and has an effect of endowing the drilling fluid with gel strength, filter loss reduction, and wall building capabilities; for example, the bentonite may be sodium bentonite and/or calcium bentonite, preferably is sodium bentonite. More preferably, the content of the bentonite is 2-4 wt %, including 3-4 wt %.

Wherein, the tackifier can improve the viscous shearing force of the drilling fluid. For example, the viscosity improver may be one or more of potassium polyacrylamide (KPAM), polyanionic cellulose (e.g., PAC141), and copolymer of acrylamide and sodium acrylate (e.g., 80A51), preferably is potassium polyacrylamide. In certain embodiments, the content of the tackifier is 0.2-0.5 wt %, including 0.3-0.5 wt %.

Wherein, the anti-collapse agent can assist the bionic shale inhibitor to prevent collapse of the well bore and improve the stability of the well bore. For example, the anti-collapse agent may be one or more of potassium humate (KHM), silicone (e.g., GF-1), and sulfonated bitumen (e.g., FT-1A), preferably is potassium humate. More preferably, the content of the anti-collapse agent is 2-4 wt %.

Wherein, the filtrate reducer can improve the filter loss reduction and wall building capabilities of the drilling fluid; for example, the filtrate reducer may be one or more of sulfomethylated phenolic resin (e.g., SMP-I, SMP-II), sulfomethylated lignite resin (e.g., SPNH), and zwitter-ionic polymer JT-888, preferably is SMP-II and/or SPNH. In certain embodiments, the content of the filtrate reducer is 1-8 wt %, and including 2-6 wt %.

Wherein, the lubricant can improve the lubricating property of the drilling fluid and prevent complex downhole accidents such as jamming of a drilling tool. For example, the lubricant may be one or more of sulfonated oil sediment (e.g., FK-10), mixture of diesel oil and surface active agent (e.g., FRH), and mixture of fatty glyceride and surface active agent (e.g., FK-1), preferably is FK-10. In certain embodiments, the content of the lubricant is 2-4 wt %.

The above additives may be commercially available products, or may be prepared with conventional methods in the art. They will not be further detailed hereunder.

According to the present invention, in the drilling fluid provided in the present invention, the modified silicon dioxide nano-particles are dispersed well and will not agglomerate into large-size particles; the resultant drilling fluid has high temperature resistance and salt resistance properties and still can attain a good plugging effect under high-temperature and high-salinity conditions, and has low filter loss.

Hereunder the present invention will be detailed in examples.

In the following examples and comparative examples:

The weight-average molecular weight and molecular weight distribution index are measured with a gel permeation chrommatograph (GPC) (GPC E2695 from Waters Corporation (a US company)).

The particle size distribution of the modified silicon dioxide nano-particles dispersed in the drilling fluid is measured with a Zeta potential and laser particle size analyzer (from Malvern Instruments Ltd. (a UK company)).

The SEM images are obtained with a F20 Field Emission SEM from Hitachi.

The TEM images are measured with a HT7700 Exalens SEM from Hitachi.

The content of the polymer chains refers to the weight percentage of the copolymer in the obtained product.

Example 1

This example is provided to describe the modified silicon dioxide nano-particles and the method for preparing the modified silicon dioxide nano-particles in the present invention.

(1) 0.12 mol p-styrenesulfonic acid and 0.19 mol N,N'-methylene-bis acrylamide (purchased from Hengtai Taili Chemical Co., Ltd.) are mixed and stirred at about 25° C. for 30 min with 300 rpm stirring speed, and the pH of the mixture is adjusted to 7 with sodium hydroxide; thus, a mixture A1 is obtained; 0.5 g silicon dioxide nano-particles (purchased from Nanjing Tianxing New Materials Co., Ltd with a trade mark TSP, in about 20 nm particle diameter) and 8 g n-propanol are mixed and stirred at about 25° C. for 30 min with 300 rpm stirring speed, to obtain a mixture B1; the mixture A1 and the mixture B1 are mixed and stirred at about 25° C. for 30 min with 300 rpm stirring speed, to obtain a mixture C1;

(2) 0.01 g coupler γ-aminopropyl-triethoxysilane (purchased from Hengtai Taili Chemical Co., Ltd. with a trade mark KH550) and the mixture C1 are mixed and react at 60° C. for 30 min while stirring at 200 rpm stirring speed; then, 0.094 g redox initiator system (consisting of sodium bisulfite and ammonium persulfate at 1:2.5 molar ratio) is added, and then the mixture takes a polymerization reaction at 60° C. for 4 h while stirring at 200 rpm stirring speed;

(3) The product of the polymerization reaction is dried at 70° C. over night (about 24 h), and then is milled; thus, modified silicon dioxide nano-particles S1 are obtained.

Analyzed by infrared, $^1$H-NMR and $^{13}$C-NMR spectroscopy, the modified silicon dioxide nano-particles S1 bear random copolymer chains composed of structural units represented by formula (1-a) ($R^3$ is —$SO_3H$, $R^1$-$R^2$ and $R^4$-$R^5$ are H, and L' is C0 alkylene) and structural units represented by formula (2-a) (L is —$CH_2$—) at 1:1.5 molar ratio, the content of the copolymer chain is 92 wt. %, and the weight-average molecular weight of the copolymer chain is about 860,000 g/mol; the particle diameter of the modified silicon dioxide nano-particles S1 is about 26 nm. An SEM image of the modified silicon dioxide nano-particles S1 is shown in FIG. 1.

Example 2

This example is provided to describe the modified silicon dioxide nano-particles and the method for preparing the modified silicon dioxide nano-particles in the present invention.
(1) 0.15 mol p-styrenesulfonic acid and 0.2 mol N,N'-methylene-bis acrylamide (purchased from Hengtai Taili Chemical Co., Ltd.) are mixed and stirred at about 30° C. for 25 min with 250 rpm stirring speed, and the pH of the mixture is adjusted to 7.5 with sodium hydroxide; thus, a mixture A2 is obtained; 1 g silicon dioxide nano-particles (purchased from Nanjing Tianxing New Materials Co., Ltd with a trade mark TSP, in about 20 nm particle diameter) and 8 g isopropanol are mixed and stirred at about 30° C. for 25 min with 250 rpm stirring speed, to obtain a mixture B2; the mixture A2 and the mixture B2 are mixed and stirred at about 30° C. for 25 min with 250 rpm stirring speed, to obtain a mixture C2;
(2) 0.012 g coupler γ-aminopropyl-triethoxysilane (purchased from Hengtai Taili Chemical Co., Ltd. with a trade mark KH550) and the mixture C2 are mixed and react at 50° C. for 30 min while stirring at 250 rpm stirring speed; then, 0.094 g redox initiator system (consisting of sodium bisulfite and ammonium persulfate at 1:3 molar ratio) is added, and then the mixture takes a polymerization reaction at 50° C. for 5 h while stirring at 200 rpm stirring speed;
(3) The product of the polymerization reaction is dried at 70° C. over night (about 24 h), and then is milled; thus, modified silicon dioxide nano-particles S2 are obtained.
Analyzed by infrared, $^1$H-NMR and $^{13}$C-NMR spectroscopy, the modified silicon dioxide nano-particles S2 bear random copolymer chains composed of structural units represented by formula (1-a) ($R^3$ is —$SO_3H$, $R^1$-$R^2$ and $R^4$-$R^5$ are H, and L' is C0 alkylene) and structural units represented by formula (2-a) (L is —$CH_2$—) at 1:1.33 molar ratio, the content of the copolymer chain is 94 wt. %, and the weight-average molecular weight of the copolymer chain is about 980,000 g/mol; the particle diameter of the modified silicon dioxide nano-particles S2 is about 23 nm.

Example 3

This example is provided to describe the modified silicon dioxide nano-particles and the method for preparing the modified silicon dioxide nano-particles in the present invention.
(1) 0.12 mol 2-methyl-4-styrene sulfonic acid and 0.19 mol N,N'-methylene-bis acrylamide (purchased from Hengtai Taili Chemical Co., Ltd.) are mixed and stirred at about 20° C. for 40 min with 350 rpm stirring speed, and the pH of the mixture is adjusted to 7 with sodium hydroxide; thus, a mixture A3 is obtained; 0.7 g silicon dioxide nano-particles (purchased from Nanjing Tianxing New Materials Co., Ltd with a trade mark TSP, in about 20 nm particle diameter) and 15 g isopropanol are mixed and stirred at about 20° C. for 40 min with 350 rpm stirring speed, to obtain a mixture B3; the mixture A3 and the mixture B3 are mixed and stirred at about 20° C. for 40 min with 350 rpm stirring speed, to obtain a mixture C3;
(2) 0.012 g coupler γ-glycidol ether propoxy-trimethoxysilane (purchased from Hengtai Taili Chemical Co., Ltd. with a trade mark KH560) and the mixture C3 are mixed and react at 70° C. for 50 min while stirring at 250 rpm stirring speed; then, 0.095 g redox initiation system (consisting of sodium bisulfite and ammonium persulfate at 1:2.5 molar ratio) is added, and then the mixture takes a polymerization reaction at 70° C. for 3.5 h while stirring at 300 rpm stirring speed;
(3) The product of the polymerization reaction is dried at 70° C. over night (about 24 h), and then is milled; thus, modified silicon dioxide nano-particles S3 are obtained.
Analyzed by infrared, $^1$H-NMR and $^{13}$C-NMR spectroscopy, the modified silicon dioxide nano-particles S2 bear random copolymer chains composed of structural units represented by formula (1-a) ($R^3$ is —$SO_3H$, $R^2$ is methyl, $R^1$ and $R^4$-$R^5$ are H, and L' is C0 alkylene) and structural units represented by formula (2-a) (L is —$CH_2$—) at 1:1.58 molar ratio, the content of the copolymer chain is 95 wt. %, and the weight-average molecular weight of the copolymer chain is about 1,280,000 g/mol; the particle diameter of the modified silicon dioxide nano-particles S3 is about 28 nm.

Example 4

This example is provided to describe the modified silicon dioxide nano-particles and the method for preparing the modified silicon dioxide nano-particles in the present invention.
(1) The step (1) of the method described in the example 1 is used;
(2) The step (2) of the method described in the example 1 is used, but the amount of the coupler γ-aminopropyl-triethoxysilane is 0.02 g, and the amount of the redox initiation system (consisting of sodium bisulfite and ammonium persulfate at 1:3 molar ratio) is 0.246 g;
(3) The product of the polymerization reaction is dried at 70° C. overnight (about 24 h), and then is milled; thus, modified silicon dioxide nano-particles S4 are obtained.
Analyzed by infrared, $^1$H-NMR and $^{13}$C-NMR spectroscopy, the modified silicon dioxide nano-particles S2 bear random copolymer chains composed of structural units represented by formula (1-a) ($R^3$ is —$SO_3H$, and $R^4$-$R^5$ are H, and L' is C0 alkylene) and structural units represented by formula (2-a) (L is —$CH_2$—) at 1:1.56 molar ratio, the content of the copolymer chain is 94 wt. %, and the weight-average molecular weight of the copolymer chain is about 150,000 g/mol; the particle diameter of the modified silicon dioxide nano-particles S4 is about 30 nm.

Example 5

This example is provided to describe the modified silicon dioxide nano-particles and the method for preparing the modified silicon dioxide nano-particles in the present invention.
(1) The step (1) of the method described in the example 1 is used;
(2) The step (2) of the method described in the example 1 is used, but the amount of the coupler γ-aminopropyl-triethoxysilane is 0.002 g, and the amount of the redox initiation system (consisting of sodium bisulfite and ammonium persulfate at 1:2.5 molar ratio) is 0.022 g;
(3) The product of the polymerization reaction is dried at 70° C. overnight (about 24 h), and then is milled; thus, modified silicon dioxide nano-particles S5 are obtained.
Analyzed by infrared, $^1$H-NMR and $^{13}$C-NMR spectroscopy, the modified silicon dioxide nano-particles S2 bear random copolymer chains composed of structural units represented by formula (1-a) ($R^3$ is —$SO_3H$, and $R^4$-$R^5$ are H, and L' is C0 alkylene) and structural units represented by formula (2-a) (L is —$CH_2$—) at 1:1.65 molar ratio, the content of the copolymer chain is 98 wt. %, and the weight-average molecular weight of the copolymer chain is about 2,200,000 g/mol; the particle diameter of the modified silicon dioxide nano-particles S5 is about 35 nm.

Example 6

This example is provided to describe the modified silicon dioxide nano-particles and the method for preparing the modified silicon dioxide nano-particles in the present invention.
The method described in the example 1 is used, but in the step (1), the amount of acrylic acid is 0.08 mol, the amount of N,N'-methylene-bis acrylamide is 0.12 mol; thus, modified silicon dioxide nano-particles S6 are obtained through three steps.
Analyzed by infrared, $^1$H-NMR and $^{13}$C-NMR spectroscopy, the modified silicon dioxide nano-particles S2 bear random copolymer chains composed of structural units represented by formula (1-a) ($R^3$ is —$SO_3H$, $R^1$-$R^2$ and $R^4$-$R^5$ are H, and L' is C0 alkylene) and structural units represented by formula (2-a) (L is —$CH_2$—) at 1:1.68 molar ratio, the content of the copolymer chain is 68 wt. %, and the weight-average molecular weight of the copolymer chain is about 120,000 g/mol; the particle diameter of the modified silicon dioxide nano-particles S6 is about 25 nm.

Comparative Example 1

The method described in the example 1 is used, but N,N'-methylene-bis acrylamide is not added in the step (1), and the amount of p-styrene sulfonic acid is increased to 0.3 mol; thus, modified silicon dioxide nano-particles DS1 are prepared through three steps.
Analyzed by infrared, $^1$H-NMR and $^{13}$C-NMR spectroscopy, the modified silicon dioxide nano-particles S2 bear random polymer chains composed of structural units represented by formula (1-a) ($R^3$ is —$SO_3H$, $R^1$-$R^2$ and $R^4$-$R^5$ are H, and L' is C0 alkylene), the content of the polymer chain is 98 wt. %, and the weight-average molecular weight of the polymer chain is about 1,500,000 g/mol; the particle diameter of the modified silicon dioxide nano-particles DS1 is about 50 nm.

Comparative Example 2

The method described in the example 1 is used, but p-styrene sulfonic acid is not added in the step (1), and the amount of N,N'-methylene-bis acrylamide is increased to 0.3 mol; thus, modified silicon dioxide nano-particles DS2 are prepared through three steps.
Analyzed by infrared, $^1$H-NMR and $^{13}$C-NMR spectroscopy, the modified silicon dioxide nano-particles S2 bear random polymer chains composed of structural units represented by formula (2-a) (L is —$CH_2$—), the content of the polymer chain is 96 wt. %, and the weight-average molecular weight of the polymer chain is about 120,000 g/mol; the particle diameter of the modified silicon dioxide nano-particles DS2 is about 42 nm.

Test Case 1

A rock core and a Teflon film (from Fann (a US company)), 250 mL water, and 250 g plugging agent (the modified silicon dioxide nano-particles prepared in the above examples and comparative examples and the unmodified silicon dioxide nano-particles purchased from Nanjing Tianxing New Materials Co., Ltd with a trade mark TSP respectively) are prepared, the water and the plugging agent are mixed and stirred to a homogeneous state, and then the mixed solution is loaded into an instrument (Fann 206846 HTHP permeability and plugging tester from Fann (a US company), the same below), the Teflon film is placed into the instrument, and then the well core is loaded into the instrument; next, the instrument is installed. The pressure is set to 100 psi (0.69 MPa). The volume V of the fluid that flows out within 60 s is logged;
A rock core, a Teflon film, and 500 mL water are prepared. The 500 mL water is loaded into the instrument, the Teflon film is placed into the instrument, and then the rock core is loaded into the instrument; next, the instrument is installed. The pressure is set to 100 psi (0.69 MPa). The volume V of the fluid that flows out within 60 s is logged; the plugging rate Y is calculated (the result is shown in Table 1):

$Y=V-V'/V\times100$

Where,
Y: plugging rate, %; V: volume of fluid that flows out from the water blank, mL; V': volume of fluid that flows out from the sample, mL.

TABLE 1

| Test Sample | Volume of Outflow within 60 s mL | Plugging Rate Y % |
|---|---|---|
| Water | 310 | / |
| S1 | 22 | 92.9 |
| S2 | 20 | 93.5 |
| S3 | 20 | 93.5 |
| S4 | 155 | 50.0 |
| S5 | 158 | 49.0 |
| S6 | 165 | 46.8 |
| DS1 | 196 | 36.8 |
| DS2 | 202 | 34.8 |
| Unmodified silicon dioxide nano-particles | 152 | 51.0 |

It is seen from Table 1: the examples 1-3 attain superior plugging effects, while the molecular weight or polymer chain content of the examples 4-6 are not preferred, the plugging effects of the resultant modified silicon dioxide nano-particles are inferior to those of the examples 1-3; the plugging effects of the modified silicon dioxide nano-particles in the comparative examples 1-2 that don't belong to the scope of the present invention are very poor; the test result of the unmodified silicon dioxide nano-particles is inferior to that of the modified silicon dioxide nano-particles provided in the present invention, because it has problems, including agglomeration into large-size particles that are difficult to disperse, etc.

Use Examples 1-6

Water-based drilling fluids are prepared according to the following formulation: 4 wt % sodium bentonite (purchased from Weifang Huawei Research Center of Bentonite Technology), 2.5 wt % $Na_2CO_3$, 1.5 wt % of each modified silicon dioxide nano-particles S1-S6 was added respectively, and water (the remaining content); thus, drilling fluids Y1-Y6 are obtained; it is seen from the TEM image: in the drilling fluids Y1-Y6, the modified silicon dioxide nano-particles have high dispersity, and there is no agglomeration phenomenon.

Wherein, the particle diameters of the modified silicon dioxide nano-particles dispersed in the drilling fluids are mainly distributed in the following ranges: drilling fluid Y1: 20-30 nm; drilling fluid Y2: 20-30 nm; drilling fluid Y3: 20-30 nm; drilling fluid Y4: 100-200 nm; drilling fluid Y5: 100-200 nm; drilling fluid Y6: 100-200 nm.

Use Examples 7-12

Water-based drilling fluids are prepared according to the following formulation: 4 wt % sodium bentonite (purchased from Weifang Huawei Bentonite Co., Ltd.), 2.5 wt % $Na_2CO_3$, 36 wt % NaCl, 1.5 wt % of each modified silicon dioxide nano-particles S1-S6 was added respectively, and water (the remaining content); thus, drilling fluids SY1-SY6 are obtained; it is seen from the TEM image: in the drilling fluids SY1-SY6, the modified silicon dioxide nano-particles have high dispersity, and there is no agglomeration phenomenon.

Wherein, the particle diameters of the modified silicon dioxide nano-particles dispersed in the drilling fluids are mainly distributed in the following ranges: drilling fluid SY1: 20-30 nm; drilling fluid SY2: 20-30 nm; drilling fluid SY3: 20-30 nm; drilling fluid SY4: 100-200 nm; drilling fluid SY5: 100-200 nm; drilling fluid SY6: 100-200 nm.

Use Comparative Examples 1-3

The method described in the use example 1 is used, but the modified silicon dioxide nano-particles S1 is replaced with modified silicon dioxide nano-particles DS1-DS2 and silicon dioxide nano-particles (purchased from Nanjing Tianxing New Materials Co., Ltd with a trade mark TSP, in about 20 nm particle diameter) respectively; thus, drilling fluids DY1-DY3 are obtained; it is seen from the TEM image: in the drilling fluids DY1-DY2, the silicon dioxide nano-particles have moderate dispersity, and partially agglomerate into large-size particles; in the drilling fluid DY3, the silicon dioxide nano-particles have poor dispersity, and largely agglomerate into large-size particles.

Wherein, the particle diameters of modified silicon dioxide nano-particles dispersed in the drilling fluids are mainly distributed in the following ranges: drilling fluid DY1: 200-400 nm; drilling fluid DY2: 200-400 nm; drilling fluid DY3: 100-1,000 nm.

Use Comparative Examples 4-6

The method described in the use example 7 is used, but the modified silicon dioxide nano-particles S1 is replaced with modified silicon dioxide nano-particles DS1-DS2 and silicon dioxide nano-particles (purchased from Nanjing Tianxing New Materials Co., Ltd with a trade mark TSP, in about 20 nm particle diameter) respectively; thus, drilling fluids DSY1-DSY3 are obtained; it is seen from the TEM image: in the drilling fluids DSY1-DSY2, the silicon dioxide nano-particles have moderate dispersity, and partially agglomerate into large-size particles; in the drilling fluid DSY3, the silicon dioxide nano-particles have poor dispersity, and largely agglomerate into large-size particles.

Wherein, the particle diameters of modified silicon dioxide nano-particles dispersed in the drilling fluids are mainly distributed in the following ranges: drilling fluid DSY1: 200-400 nm; drilling fluid DSY2: 200-400 nm; drilling fluid DSY3: 100-1,000 nm.

Test Case 2

The plastic viscosity (PV), apparent viscosity (AV), yield point (YP), ratio of initial gel strength to final gel strength (G10″/10′), and filter loss (FL) of the drilling fluids Y1-Y6, SY1-SY6, DY1-DY3, and DSY1-DSY3 are measured at room temperature without aging treatment and after aging treatment for 16 h at 150° C. respectively. The results are shown in table 2, wherein:

The plastic viscosity (PV) is measured with a FANN six-speed viscosity meter with the method specified in the national standard GB/T29170-2012, in unit of mPa·s, $PV=\theta_{600}-\theta_{300}$.

The apparent viscosity (AV) is measured with a FANN six-speed viscosity meter with the method specified in the national standard GB/T29170-2012, in unit of mPa·s, $AV=\frac{1}{2}\theta_{600}$.

The yield point (YP) is measured with a FANN six-speed viscosity meter with the method specified in the national standard GB/T29170-2012, $YP=0.511\times(2\times\phi300-\phi600)$, in unit of Pa.

The ratio of initial gel strength to final gel strength (G10″/10′) is measured with a FANN six-speed viscosity meter with the method specified in the national standard GB/T29170-2012, in unit of Pa/Pa.

The filter loss (FL) is measured with an API filter tester with the method specified in the national standard GB/T29170-2012.

TABLE 2

| | Drilling Fluid | AV (mPa·s) | PV (mPa·s) | YP (Pa) | G10″/10′ (Pa/Pa) | FL (mL) |
|---|---|---|---|---|---|---|
| Before aging | Y1 | 33.5 | 18 | 15.5 | 10/8 | 7.6 |
| | Y2 | 34.5 | 16 | 18.5 | 10.5/8 | 7.4 |
| | Y3 | 33.5 | 19 | 14.5 | 9/7.5 | 7.6 |
| | Y4 | 30 | 11 | 19 | 7/6 | 11.6 |
| | Y5 | 29.5 | 11 | 18.5 | 5/4 | 11.8 |
| | Y6 | 37.5 | 21 | 16.5 | 6/5 | 12.2 |
| | DY1 | 20 | 12 | 8 | 4/2.5 | 16.8 |
| | DY2 | 33 | 16 | 17 | 4.5/3 | 17.2 |
| | DY3 | 18 | 10 | 8 | 3/2.5 | 18.4 |
| | SY1 | 31 | 17 | 14 | 5.5/4 | 8.2 |
| | SY2 | 32.5 | 20 | 12.5 | 6/5.5 | 8 |
| | SY3 | 32 | 15 | 17 | 4.5/3.5 | 8.2 |
| | SY4 | 35 | 20 | 15 | 2/1 | 12.2 |
| | SY5 | 30.5 | 17 | 13.5 | 2/1 | 11.6 |
| | SY6 | 32.5 | 17 | 15.5 | 3/1 | 11.8 |
| | DSY1 | 17.5 | 15 | 2.5 | 1/1 | 15.8 |
| | DSY2 | 22 | 16 | 6 | 1/1 | 16.4 |
| | DSY3 | 18 | 11 | 7 | 4/2 | 19 |
| After aging | Y1 | 25.5 | 19 | 6.5 | 6/3 | 9.2 |
| | Y2 | 26 | 15 | 11 | 7/3 | 9 |
| | Y3 | 22 | 15 | 7 | 6/3 | 9.4 |
| | Y4 | 20 | 13 | 7 | 3/1 | 13.2 |
| | Y5 | 17.5 | 14 | 3.5 | 1/1 | 13.8 |
| | Y6 | 13.5 | 9 | 4.5 | 1/1 | 13.2 |
| | DY1 | 15.5 | 10 | 5.5 | 2/1 | 22.2 |
| | DY2 | 16 | 12 | 4 | 2/1 | 24.4 |
| | DY3 | 10.5 | 6 | 5.5 | 1/1 | 29.8 |
| | SY1 | 25.5 | 16 | 9.5 | 5/3 | 10 |
| | SY2 | 24 | 13.5 | 10.5 | 4.5/2 | 9.8 |
| | SY3 | 24 | 12 | 12 | 5/2.5 | 10.2 |
| | SY4 | 17.5 | 15 | 2.5 | 1/1 | 18.2 |
| | SY5 | 16 | 10 | 6 | 1/1 | 17.8 |
| | SY6 | 17 | 10 | 7 | 1/1 | 16.8 |
| | DSY1 | 7.5 | 4 | 3.5 | 1/1 | 27.4 |
| | DSY2 | 8 | 5 | 3 | 1/1 | 29.8 |
| | DSY3 | 8 | 4 | 4 | 1/1 | 36.6 |

It is seen from Table 2: the drilling fluids with the modified silicon dioxide nano-particles provided in the present invention added as a plugging agent obtain better temperature resistance and salinity resistance properties; in addition, compared with the modified silicon dioxide nano-particles in the examples 4-6 and comparative examples 1-2 and the unmodified silicon dioxide nano-particles, the modified silicon dioxide nano-particles in the examples 1-3 attain better temperature resistance and salinity resistance results.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A modified silicon dioxide nano-particle including a modifying group,
the modifying group comprises a modifying polymer chain composed of structural units provided by one or more monomers represented by formula (1) and one or more monomers represented by formula (2); in the modifying polymer chain, the molar ratio of the structural units provided by the monomers represented by formula (1) to the structural units provided by the monomers represented by formula (2) is 1:0.5-5; the weight-average molecular weight of the modifying polymer chain is 100,000-2,500,000 g/mol;

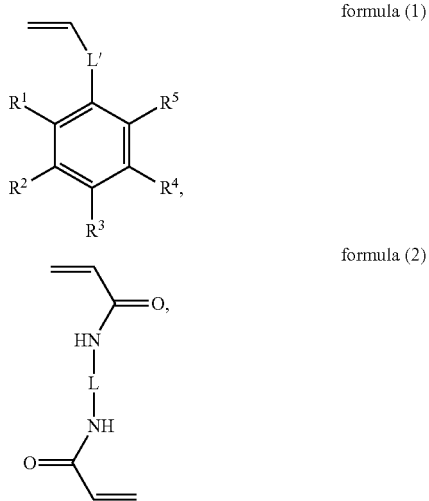

formula (1)

formula (2)

wherein one of $R^1$-$R^5$ is -L"-$SO_3H$ and the rest of $R^1$-$R^5$ are independently selected from H, —OH, halogen, and C1-C10 alkyl; L, L' and L" are independently selected from C0-C10 alkylene.

2. The modified silicon dioxide nano-particle according to claim 1, wherein the structural units in the modifying polymer chain is composed of one or more structural units represented by the following formula (1-a) and one or more structural units represented by the following formula (2-a):

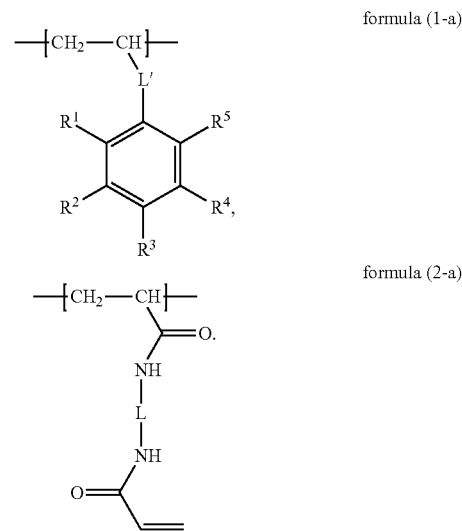

formula (1-a)

formula (2-a)

3. The modified silicon dioxide nano-particle according to claim 1, wherein one of $R^1$-$R^5$ is -L"-$SO_3H$, and the rest of $R^1$-$R^5$ are independently selected from H, and C1-C6 alkyl; L, L' and L" are independently selected from C0-C6 alkylene.

4. The modified silicon dioxide nano-particle according to claim 3, wherein one of $R^1$-$R^5$ is -L"-$SO_3H$, and the rest of $R^1$-$R^5$ are independently selected from H, and C1-C4 alkyl; L, L' and L" are independently selected from C0-C4 alkylene.

5. The modified silicon dioxide nano-particle according to claim 4, wherein one of $R^1$-$R^5$ is -L"-$SO_3H$, and the rest of $R^1$-$R^5$ are independently selected from H, methyl, ethyl, propyl and butyl; L' and L" are independently selected from C0 alkylene, —$CH_2$—, —$CH_2$—$CH_2$—, —$CH_2$—$CH_2$—$CH_2$—, —$CH(CH_3)$—$CH_2$—, —$C(CH_3)_2$—$CH_2$—, —$CH_2$—$C(CH_3)_2$— and —$CH_2$—$CHCH_3$—$CH_2$—; L is —$CH_2$—, —$CH_2$—$CH_2$—, —$CH_2$—$CH_2$—$CH_2$—, —$CH(CH_3)$—$CH_2$—, —$C(CH_3)_2$—$CH_2$—, —$CH_2$—$C(CH_3)_2$— or —$CH_2$—$CHCH_3$—$CH_2$—.

6. The modified silicon dioxide nano-particle according to claim 1, wherein in the modifying polymer chain, the molar ratio of the structural units provided by the monomers represented by formula (1) to the structural units provided by the monomers represented by formula (2) is 1:1-2.

7. The modified silicon dioxide nano-particle according to claim 1, wherein the weight-average molecular weight of the modifying polymer chain is 300,000-1,800,000 g/mol.

8. The modified silicon dioxide nano-particle according to claim 1, wherein based on the total weight of the modified silicon dioxide nano-particle, the content of the modifying polymer chain is 60 wt. % or higher;
the particle diameter of the modified silicon dioxide nano-particle is 3-30 nm.

9. The modified silicon dioxide nano-particle according to claim 8, wherein based on the total weight of the modified silicon dioxide nano-particle, the content of the modifying polymer chain is 85 wt. % or higher;
the particle diameter of the modified silicon dioxide nano-particle is 10-30 nm.

10. A method for preparing the modified silicon dioxide nano-particle according to claim 1 comprising:
(1) mixing one or more monomers represented by formula (1) and one or more monomers represented by formula (2) with silicon dioxide nano-particles, in the presence of a monohydric alcohol and a coupler to form a reaction mixture;

(2) reacting a product of the reaction mixture, in the presence of a redox initiator system;

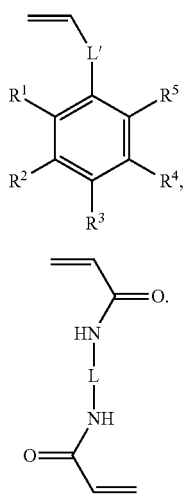

formula (1)

formula (2)

11. The method according to claim 10, wherein the molar ratio of the monomers represented by formula (1) to the monomers represented by formula (2) is 1:0.5-5.

12. The method according to claim 10, wherein based on the total amount of the silicon dioxide nano-particles, the monomers represented by formula (1) and the monomers represented by formula (2), the total amount of the monomers represented by formula (1) and the monomers represented by formula (2) is 60 wt. % or higher.

13. The method according to claim 10, wherein the monohydric alcohol is one or more of methanol, ethanol, n-propanol and isopropanol.

14. The method according to claim 10, wherein the coupler is one or more of γ-amino propyl-triethoxy silane, γ-glycidol ether propoxy-trimethoxy silane, γ-(methylacryloyloxy) propyl-trimethoxy silane, and N-(β-aminoethyl)-γ-aminopropyl-trimethoxysilane.

15. The method according to claim 10, wherein the step (1) comprises: mixing the monomers represented by formula (1) and the monomers represented by formula (2) firstly, and adjusting the pH of the obtained mixture to 7-9; then, subjecting the mixture to have a contact reaction with the silicon dioxide nano-particles, in the presence of the monohydric alcohol and the coupler.

16. The method according to claim 10, wherein reducer in the redox initiator system is sodium bisulfite, and oxidizer in the redox initiator system is ammonium persulfate.

17. The method according to claim 10, wherein with respect to 1 mol total amount of the monomers represented by formula (1) and the monomers represented by formula (2), the amount of the redox initiator system is 0.05-1 g.

18. The method according to claim 10, wherein in the step (1), the conditions of the contact reaction include: temperature of 10-40° C., and time of 10-60 min.

19. A drilling fluid containing the modified silicon dioxide nano-particles according to claim 1 as plugging agent.

20. The drilling fluid according to claim 19, wherein the content of modified silicon dioxide nano-particles is 1-2 wt. %.

* * * * *